United States Patent
Saitoh et al.

(10) Patent No.: US 9,663,053 B2
(45) Date of Patent: May 30, 2017

(54) COLLISION DETECTION DEVICE FOR VEHICLE

(71) Applicant: DENSO CORPORATION, Kariya, Aichi-pref. (JP)

(72) Inventors: Yukihiro Saitoh, Tokoname (JP); Takatoshi Tanabe, Ichinomiya (JP); Daisuke Nakane, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/819,235

(22) Filed: Aug. 5, 2015

(65) Prior Publication Data

US 2016/0039379 A1    Feb. 11, 2016

(30) Foreign Application Priority Data

Aug. 8, 2014   (JP) .................................. 2014-162475

(51) Int. Cl.
  *B60R 21/0136* (2006.01)
  *B60R 19/48* (2006.01)
  *B60R 19/18* (2006.01)

(52) U.S. Cl.
  CPC .......... *B60R 21/0136* (2013.01); *B60R 19/18* (2013.01); *B60R 19/483* (2013.01); *B60R 2019/186* (2013.01)

(58) Field of Classification Search
  CPC ....... B60R 19/18; B60R 19/20; B60R 19/483; B60R 2019/186; B60R 21/0136
  See application file for complete search history.

(56) References Cited

U.S. PATENT DOCUMENTS 3,859,482 A * 1/1975 Matsui ................. B60R 21/013
                                                      200/61.08
5,335,749 A * 8/1994 Taguchi ............. B60R 21/0136
                                                      180/274
(Continued)

FOREIGN PATENT DOCUMENTS

DE        EP 1281582 A2  *  2/2003  ........... B60R 19/483
JP   DE 102007041786 A1  *  4/2008  ........... B60R 19/483
(Continued)

*Primary Examiner* — Glenn Dayoan
*Assistant Examiner* — Paul Chenevert
(74) *Attorney, Agent, or Firm* — Knobbe, Martens, Olson & Bear, LLP (57) ABSTRACT

A collision detection device includes a chamber member, a pressure sensor, a collision detection ECU, and a projecting portion. The chamber member is disposed on a vehicle-front side of a bumper reinforcement in a bumper cover and includes a chamber main body having therein a hollow portion. The pressure sensor detects pressure in the hollow portion of the chamber main body. A clearance is formed between the chamber member and a front surface of the bumper reinforcement at least on a part of a rear surface of the chamber main body. The collision detection ECU detects a collision of an object with the bumper cover based on a pressure detection result by the pressure sensor. The projecting portion is provided to project from the rear surface of the chamber main body, and an end of the projecting portion is in contact with the front surface of the bumper reinforcement.

16 Claims, 6 Drawing Sheets

(56) References Cited

U.S. PATENT DOCUMENTS

| | | | | |
|---|---|---|---|---|
| 5,826,903 A * | 10/1998 | Schiller | B60R 21/0136 | 280/735 |
| 7,331,415 B2 * | 2/2008 | Hawes | B60R 21/0136 | 180/274 |
| 7,429,916 B2 * | 9/2008 | Kiribayashi | B60R 19/483 | 180/274 |
| 7,456,382 B2 * | 11/2008 | Inamoto | B60R 21/0136 | 250/214 A |
| 7,733,219 B2 * | 6/2010 | Kamei | B60R 19/483 | 180/274 |
| 7,743,669 B2 * | 6/2010 | Suzuki | B60R 19/483 | 73/800 |
| 7,823,683 B2 * | 11/2010 | Kiribayashi | B60R 19/20 | 180/274 |
| 7,911,331 B2 * | 3/2011 | Tanabe | B60R 19/483 | 180/274 |
| 7,952,469 B2 * | 5/2011 | Suzuki | B60R 21/0136 | 340/435 |
| 7,980,606 B2 * | 7/2011 | Takahashi | B60R 21/0136 | 293/117 |
| 8,128,140 B2 * | 3/2012 | Tanabe | B60R 21/0136 | 293/117 |
| 8,350,685 B2 * | 1/2013 | Tanabe | B60R 21/0136 | 180/274 |
| 8,368,523 B2 * | 2/2013 | Takahashi | B60R 19/483 | 180/274 |
| 8,653,958 B2 * | 2/2014 | Tanabe | B60R 19/20 | 293/132 |
| 9,067,553 B1 * | 6/2015 | Ghannam | B60R 21/0136 | |
| 9,174,595 B2 * | 11/2015 | Ghannam | B60R 19/20 | |
| 2001/0000886 A1 * | 5/2001 | Breed | B60J 10/00 | 180/274 |
| 2007/0115104 A1 * | 5/2007 | Suzuki | B60R 21/0136 | 340/436 |
| 2009/0024323 A1 | 1/2009 | Tanabe | | |
| 2016/0039376 A1 * | 2/2016 | Narita | B60R 19/483 | 293/4 |
| 2016/0101753 A1 * | 4/2016 | Higashimachi | B60R 19/023 | 293/117 |

FOREIGN PATENT DOCUMENTS

| | | | | |
|---|---|---|---|---|
| JP | DE 102010017816 A1 * | 2/2011 | | B60R 19/483 |
| JP | 2011-042188 A | 3/2011 | | |
| JP | DE 102011050565 A1 * | 11/2011 | | B60R 21/0136 |
| JP | 2013-014292 A | 1/2013 | | |
| JP | 5424067 B2 * | 2/2014 | | B60R 19/483 |
| JP | DE 102013110153 A1 * | 4/2014 | | B60R 19/483 |
| JP | DE 102013110258 A1 * | 4/2014 | | B60R 19/48 |
| JP | DE 102013220347 A1 * | 4/2014 | | B60R 21/0136 |
| JP | 2014-10109 A | 6/2014 | | |
| JP | 5967056 B2 * | 8/2016 | | B60R 19/48 |
| KR | WO 2004103777 A1 * | 12/2004 | | B60R 19/20 |

* cited by examiner

COLLISION DETECTION DEVICE FOR VEHICLE

CROSS REFERENCE TO RELATED APPLICATION

This application is based on Japanese Patent Application No. 2014-162475 filed on Aug. 8, 2014, the disclosure of which is incorporated herein by reference.

TECHNICAL FIELD

The present disclosure relates to a collision detection device for a vehicle that detects a collision of an object such as a pedestrian with a bumper of the vehicle.

BACKGROUND

Conventionally, there is a vehicle including a pedestrian protective device for reducing an impact on a pedestrian when the pedestrian collides with the vehicle. This vehicle is provided with a collision detection device having a sensor at a bumper portion. If it is detected by this sensor that a pedestrian or the like collides with the vehicle, the pedestrian protective device is activated to mitigate an impact on the pedestrian. For this pedestrian protective device, there is a device called a pop-up hood, for example. At the time of detection of the collision of the vehicle, this pop-up hood lifts up a rear end of an engine hood to increase a distance (clearance) between the pedestrian and a hard component such as an engine. The pop-up hood absorbs the energy of the collision with the pedestrian's head by using this space to reduce the impact on the head.

As the above-described collision detection device for a vehicle, there is a device that includes a chamber member having therein a hollow portion on a front surface of a bumper reinforcement in the vehicle bumper and that detects the pressure in the hollow portion of this chamber member by a pressure sensor. In the device having this configuration, when an object such as a pedestrian collides with the bumper (bumper cover), the chamber member is deformed due to the deformation of the bumper cover to cause a pressure change in the hollow portion of the chamber member. The device detects the collision of the object through the detection of this pressure change by the pressure sensor (see, for example, JP2009-23407A, U.S. Patent Application Publication 2009/0024323).

In the collision detection device for a vehicle having the above configuration, a clearance may be made because contour shapes such as curvature differ between a rear surface of the chamber member and the front surface of the bumper reinforcement. In this case, at the time of the collision between the vehicle and the pedestrian or the like, the clearance existing on a vehicle-rear side of the chamber member influences the deformation of the chamber member in accordance with the deformation of the bumper cover. Accordingly, there is an issue that the accuracy (time-responsiveness) in detection of the pressure change by the pressure sensor is reduced and that the accuracy in the collision detection may thereby be decreased.

SUMMARY

The present disclosure addresses at least one of the above issues. Thus, it is an objective of the present disclosure to provide a chamber-type collision detection device for a vehicle that can maintain accuracy in collision detection even though a clearance is formed between a chamber member and a bumper reinforcement.

To achieve the objective of the present disclosure, there is provided a collision detection device for a vehicle having a bumper cover and a bumper reinforcement. The collision detection device includes a chamber member, a pressure sensor, a collision detection ECU, and a projecting portion. The chamber member is disposed on a vehicle-front side of the bumper reinforcement in the bumper cover and includes a chamber main body having therein a hollow portion. The pressure sensor detects pressure in the hollow portion of the chamber main body. A clearance is formed between the chamber member and a front surface of the bumper reinforcement at least on a part of a rear surface of the chamber main body. The collision detection ECU detects a collision of an object with the bumper cover based on a pressure detection result by the pressure sensor. The projecting portion is provided to project from the rear surface of the chamber main body, and an end of the projecting portion is in contact with the front surface of the bumper reinforcement.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
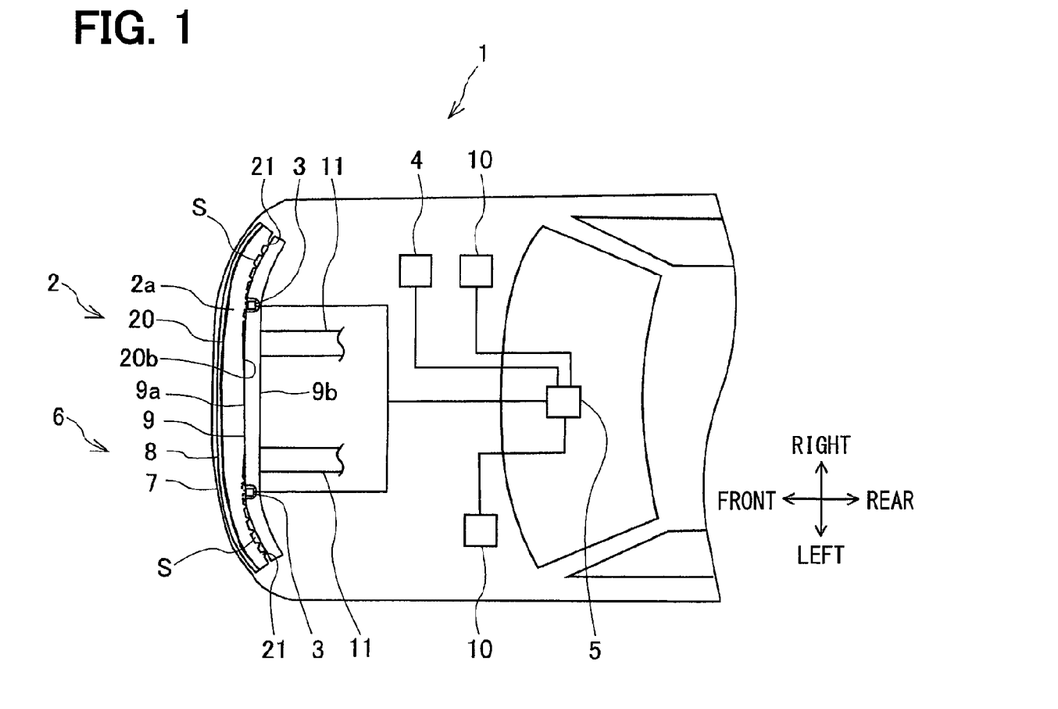
FIG. 1 is a diagram illustrating an entire configuration of a collision detection device for a vehicle in accordance with a first embodiment.
Figure 2:
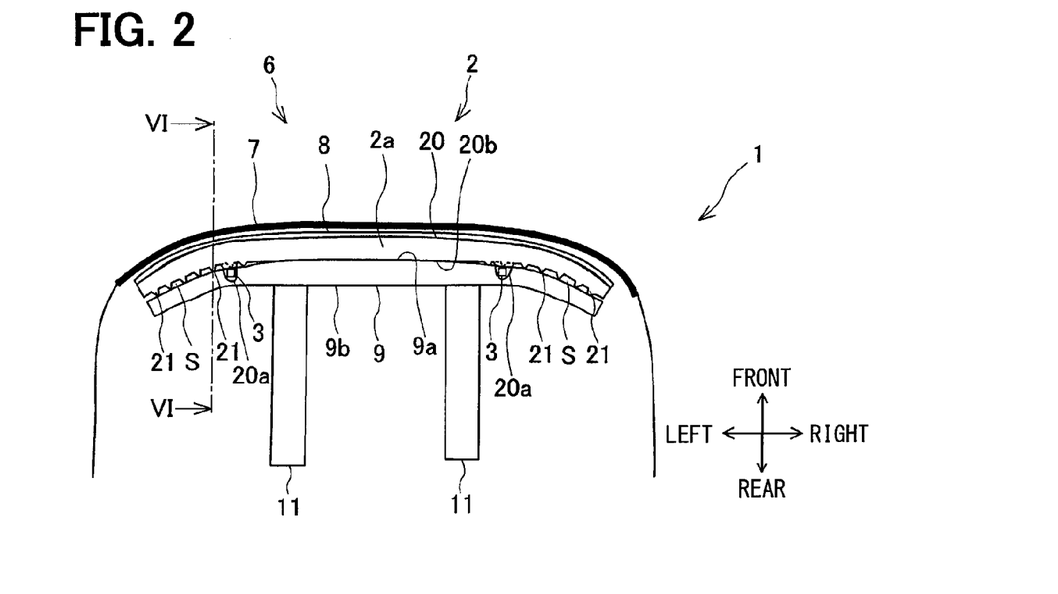
FIG. 2 is an enlarged view illustrating a bumper portion in FIG. 1.
Figure 5:
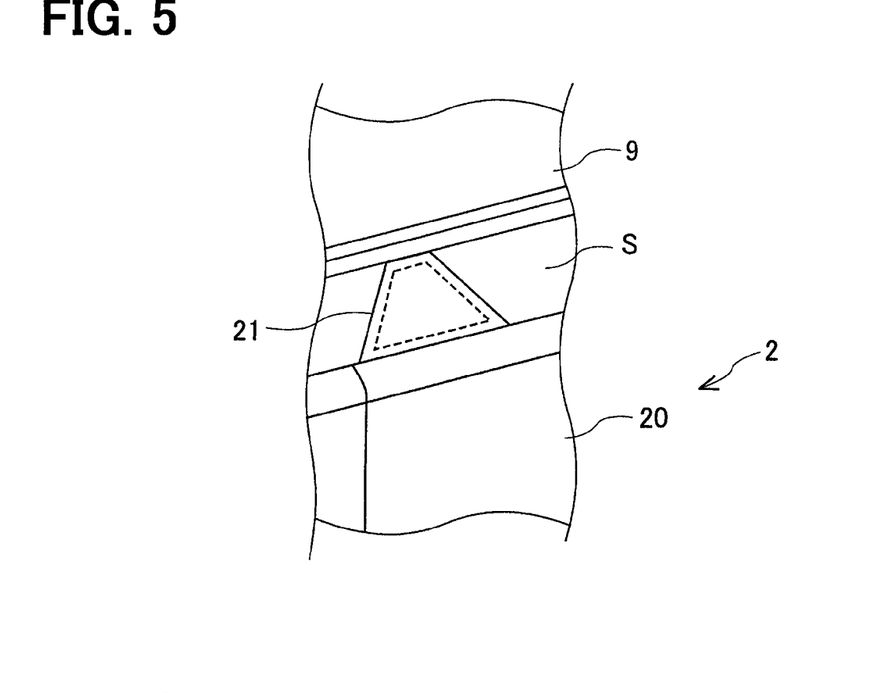
FIG. 5 is an enlarged view illustrating a projecting portion of the chamber member in FIG. 1.
Figure 6:
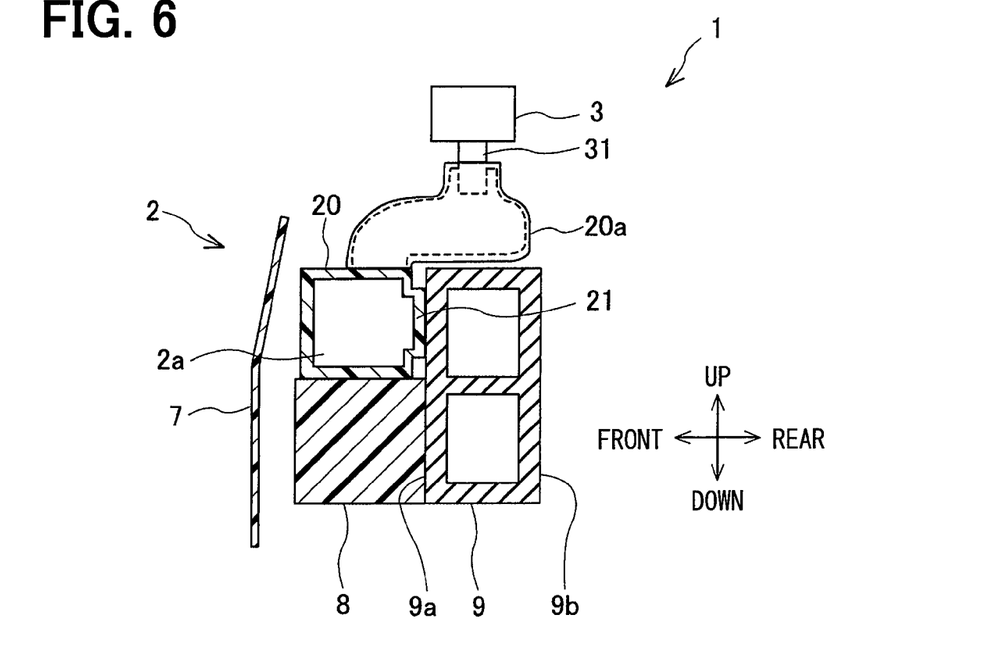
FIG. 6 is a sectional view taken along a line VI-VI in FIG. 2.
Figure 7:
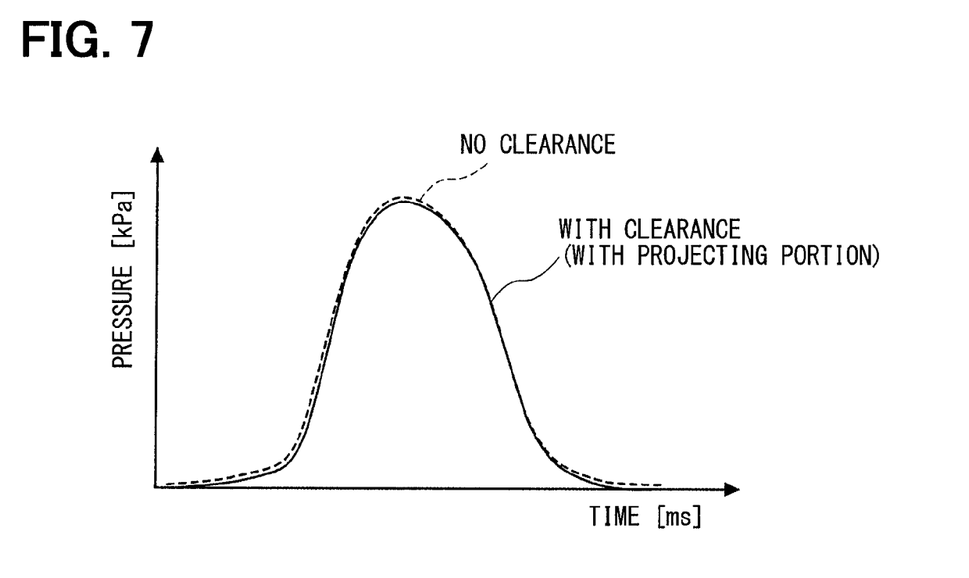
FIG. 7 is a graph illustrating pressure characteristics of the chamber member according to the first embodiment.
Figure 8:
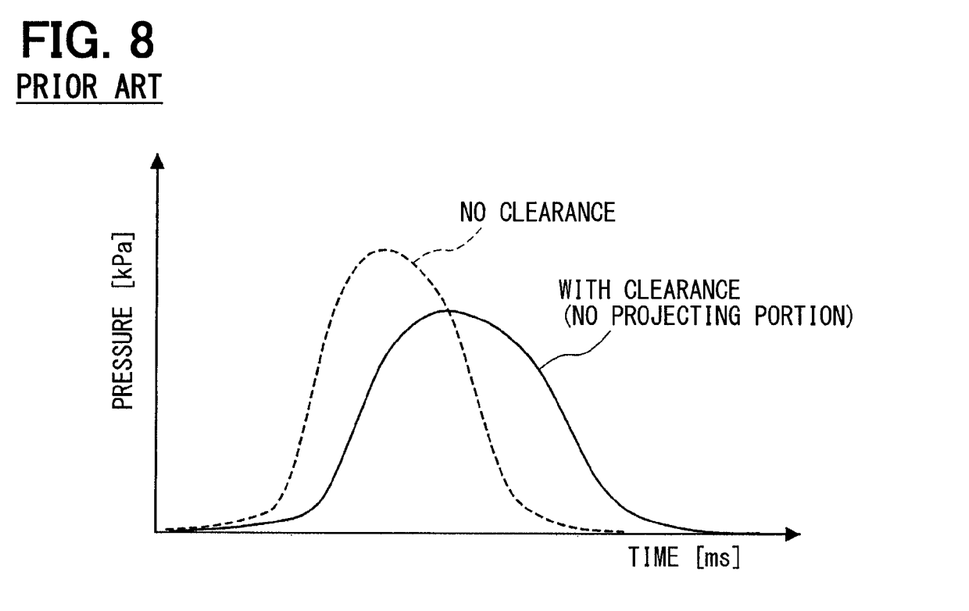
FIG. 8 is a comparative graph illustrating pressure characteristics of a conventional chamber member.

A collision detection device for a vehicle in a first embodiment will be described below with reference to FIGS. 1 to 8. As illustrated in FIGS. 1 and 2, a collision detection device 1 for a vehicle of the present embodiment includes a chamber member 2, a pressure sensor 3, a speed sensor 4, and a collision detection electronic control unit (ECU) 5. This collision detection device 1 for a vehicle detects a collision of an object (e.g., pedestrian) with a bumper 6 (bumper cover 7) provided on a vehicle-front side. As illustrated in FIG. 6, this bumper 6 mainly includes the bumper cover 7, a bumper absorber 8, and a bumper reinforcement 9.

The chamber member 2 is a member including a chamber main body 20 having therein a hollow portion 2a and extending in a vehicle width direction (right-left direction of the vehicle). The chamber member 2 is disposed on an upper side of a front surface 9a (vehicle-front side) of the bumper reinforcement 9 in the bumper cover 7 of the vehicle and on an upper side of the bumper absorber 8 (see FIG. 6). The length of the chamber main body 20 in a front-rear direction of the vehicle is constant along the entire width direction of the vehicle.

The chamber member 2 (chamber main body 20) is made form low density polyethylene, for example. The chamber main body 20 has a substantially quadrangular shape in cross-section. The length of height and width of the chamber main body 20 (corresponding to an outer diameter in a case of a circular tube) is approximately 50 mm, for example.

As illustrated in FIG. 6, the chamber member 2 includes an extended portion 20a whose inner part communicates with the hollow portion 2a. Two extended portions 20a are arranged on right and left sides of the center in the vehicle width direction. The extended portion 20a extends from an upper surface of the chamber main body 20 toward above the bumper reinforcement 9. This extended portion 20a is formed integrally with the chamber main body 20 by blow molding. The extended portion 20a includes an opening (not shown) on its upper surface, and the pressure sensor 3, which is hereinafter described, is attached to the extended portion 20a with a pressure introducing pipe 31 inserted in the opening. The clearance between the pressure introducing pipe 31 and the opening is sealed.

Although the hollow portion 2a of the chamber member 2 is surrounded and covered with the chamber main body 20, the hollow portion 2a is not sealed and communicates with the outside air at its partly narrow part. Accordingly, an air-pressure difference between the hollow portion 2a and the outside air due to a difference in elevation or a change of temperature, for example, is not made so that the collision detection is not affected by the change of elevation or air temperature. The hollow portion 2a communicates with the pressure introducing pipe 31 of the pressure sensor 3 through the extended portion 20a.

Figure 3:
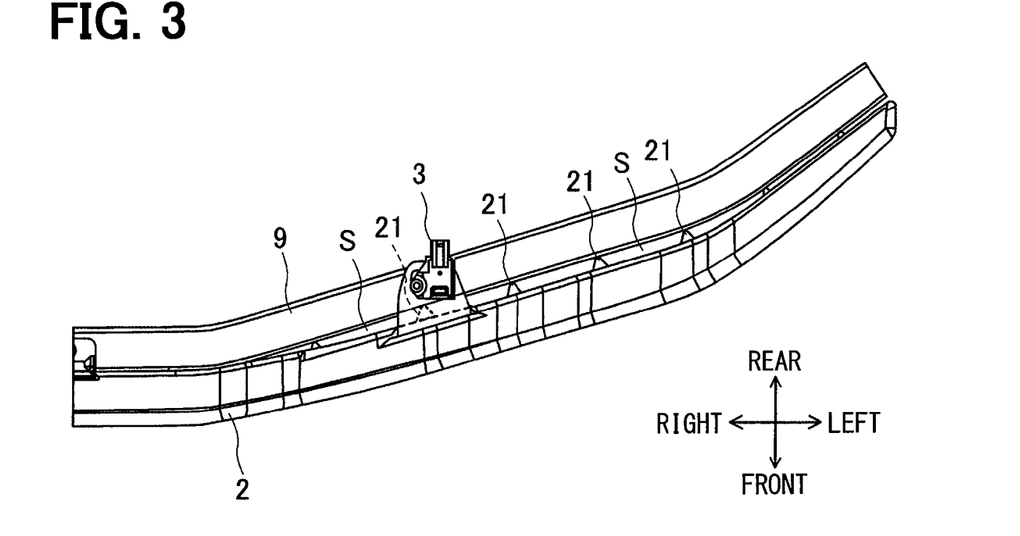
FIG. 3 is an enlarged view illustrating a chamber member and a bumper reinforcement in FIG. 1.

A clearance S is formed between the chamber member 2 and the front surface 9a of the bumper reinforcement 9 on at least a part of a rear surface 20b of the chamber main body 20, in this case, on the rear surfaces 20b of the right and left end regions of the chamber main body 20 in the vehicle width direction (see FIG. 3). This clearance S is caused by a difference in shape between the rear surface 20b of the chamber main body 20 and the front surface 9a of the bumper reinforcement 9.

When the clearance S is made between the rear surface 20b of the chamber main body 20 and the front surface 9a of the bumper reinforcement 9 (and when a projecting portion 21 is not provided), at the time of collision, it takes time for the chamber main body 20 to be deformed and brought into contact with the front surface 9a of the bumper reinforcement 9. For this reason, time-responsiveness (pressure characteristics) of the collision detection by the collision detection device 1 for the vehicle at the time of collision, i.e., the detection of a pressure change in the hollow portion 2a of the chamber main body 20 by the pressure sensor 3 is delayed compared to a case of no clearance S (see FIG. 8).

In the present embodiment, as illustrated in FIG. 3, the projecting portions 21 are provided on the rear surface 20b of the chamber main body 20 to restrict the impaired time-responsiveness of the detection of the pressure change by the pressure sensor 3 due to the existence of this clearance S. The end of the projecting portion 21 protrudes toward the bumper reinforcement 9 to be in contact with the front surface 9a of the bumper reinforcement 9. Accordingly, the time-responsiveness (pressure characteristics) of the collision detection by the chamber member 2 is improved and can be maintained at the same level as the case of no clearance S (see FIG. 7).

The length of the clearance S between the rear surface 20b of the chamber main body 20 and the front surface 9a of the bumper reinforcement 9 in the front-rear direction of the vehicle varies according to its position in the vehicle width direction. Thus, for the end of each projecting portion 21 to be in contact with the front surface 9a of the bumper reinforcement 9, the length of each projecting portion 21 in the front-rear direction of the vehicle varies according to its position in the vehicle width direction.

The projecting portion 21 is formed integrally with the chamber main body 20. Specifically, the projecting portion 21 is made from low density polyethylene which is the same resin material as the chamber main body 20, and is formed integrally with the chamber main body 20 by blow molding.

Figure 4:
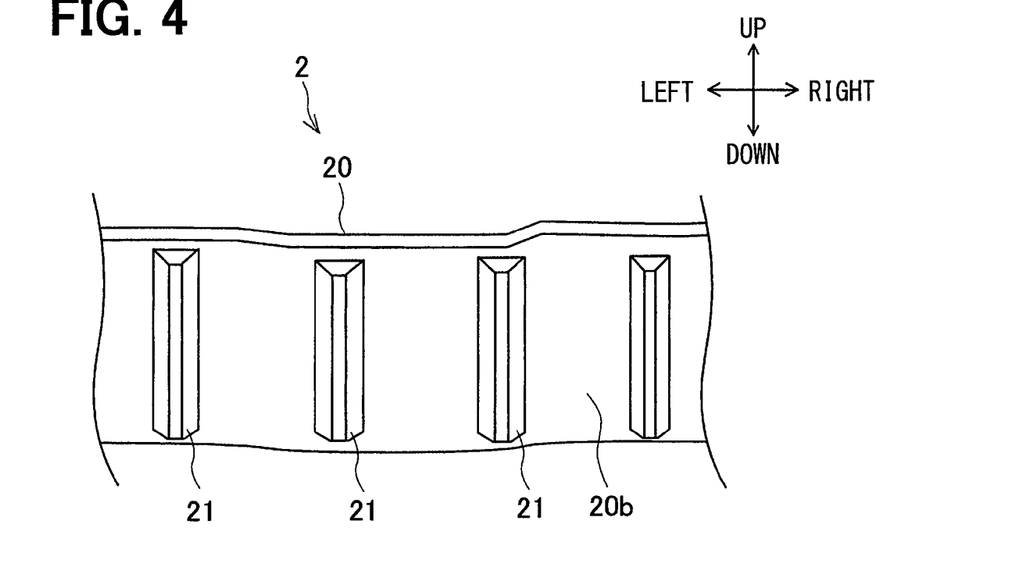
FIG. 4 is a diagram illustrating the chamber member in FIG. 1 viewed from a rear side of the vehicle.

As illustrated in FIG. 4, this projecting portion 21 is provided to extend in an up-down direction of the vehicle. Specifically, the projecting portions 21, in this case, seven projecting portions 21 are provided on each of the right and left sides on the rear surfaces 20b of the right and left end regions of the chamber main body 20 at a predetermined interval (e.g., approximately 80 mm) in the vehicle width direction (see FIG. 3). This interval (pitch) is set at such a length that the projecting portion 21 can withstand the load applied at the time of collision between the vehicle and a pedestrian or the like. These projecting portions 21 are formed in a tapered shape whose diameter is reduced toward its end, and are formed, in this case, into a trapezoidal shape in its planar view as illustrated in FIG. 5.

In the present embodiment, a decrease in accuracy of the collision detection due to the temperature change is limited as a result of the cross-sectional shape of the chamber main body 20 being the substantially quadrangular shape. Specifically, by setting the cross-sectional shape of the chamber main body 20 at the substantially quadrangular shape, the portion of the chamber main body 20 other than a collision portion (portion deformed due to deformation of the bumper cover 7 at the time of collision) is more easily swollen by a pressure rise in the chamber main body 20 than in the case of use of the chamber main body 20 that is circular in cross-section, for example. The swelling amount of this portion of the chamber main body 20 other than the collision portion becomes large at high temperature and small at low temperature. Accordingly, with respect to the same deformation amount of the collision portion, the chamber main body 20 has low sensitivity at high temperature and high sensitivity at low temperature. On the other hand, the deformation amount of the collision portion of the chamber main body 20 is determined by the characteristics of the bumper absorber 8, and the deformation amount becomes large at high temperature and small at low temperature. Therefore, the deformation amount of the collision portion that change depending on temperature can be canceled out by the effect of the portion of the chamber main body 20 other than the collision portion being swollen. As a result, the increase in output from the pressure sensor 3 as the temperature becomes higher is restrained to enable the inhibition of the decrease in accuracy of the collision detection according to the temperature change.

The pressure sensor 3 is a sensor device that detects a pressure change of gas. This pressure sensor 3 includes the pressure introducing pipe 31. The pressure introducing pipe 31 is inserted in the above-described opening of the extended portion 20*a* to communicate with the inside of the hollow portion 2*a*. Accordingly, the pressure sensor 3 is configured to be capable of detecting the pressure change of air in the hollow portion 2*a* of the chamber main body 20.

Two pressure sensors 3 are arranged on right and left sides of the center in the vehicle width direction corresponding to the above-described extended portions 20*a* above the bumper reinforcement 9 (see FIG. 6). In the present embodiment, by providing the two pressure sensors 3 in this manner, redundancy and detection accuracy are ensured. As illustrated in FIG. 1, these two pressure sensors 3 are electrically connected to the collision detection ECU 5 via transmission lines to output a signal proportional to the pressure to the collision detection ECU 5.

The speed sensor 4 is a sensor device that detects the speed of the vehicle, and is electrically connected to the collision detection ECU 5 via a signal line. This speed sensor 4 transmits a signal proportional to the vehicle speed to the collision detection ECU 5.

The collision detection ECU 5 mainly includes a central processing unit (CPU), and controls the overall operation of the collision detection device 1 for the vehicle. The ECU 5 is electrically connected to each of the pressure sensors 3 and pedestrian protective devices 10 (see FIG. 1). For example, a pressure signal (pressure data) from the pressure sensor 3 is inputted into the collision detection ECU 5. The collision detection ECU 5 executes predetermined collision determination processing based on a pressure detection result (input signal) by the pressure sensor 3, and activates the pedestrian protective device 10 on detecting the collision of a pedestrian or the like with the bumper 6 (bumper cover 7).

The bumper 6 is for lessening the impact at the time of collision of the vehicle, and includes the bumper cover 7, the bumper absorber 8, and the bumper reinforcement 9. The bumper cover 7 is provided to cover the components of the bumper 6, and is made from a resin member such as polypropylene. This bumper cover 7 serves as external appearance of the bumper 6 and is also configured as a part of the external appearance of the entire vehicle, such as a bumper fascia.

As illustrated in FIG. 6, the bumper absorber 8 is provided on the front surface 9*a* of the bumper reinforcement 9, and is disposed to surround the chamber member 2. This bumper absorber 8 is a member having a function of impact absorption in the bumper 6, and is made from, for example, polypropylene foam.

The bumper reinforcement 9 is a structural member made from metal such as aluminum that is disposed in the bumper cover 7 and that extends in the vehicle width direction, and is a hollow member that includes a beam at the center in the reinforcement 9 and that has a B-shape in cross-section as illustrated in FIG. 6. The bumper reinforcement 9 includes a vehicle-front side surface (front surface 9*a*) and a vehicle-rear side surface (rear surface 9*b*). This bumper reinforcement 9 is attached to the front ends of side members 11 which are a pair of metal members extending in the front-rear direction of the vehicle (see FIGS. 1 and 2).

As the pedestrian protective device 10, for example, a pop-up hood is used. Although not shown, this pop-up hood operates an actuator immediately after the detection of collision of the vehicle. Consequently, the pop-up hood lifts up a rear end of an engine hood to increase a distance (clearance) between the pedestrian and a hard component such as an engine. The pop-up hood absorbs the energy of the collision with the pedestrian's head by using this space to reduce the impact on the pedestrian's head. For example, a cowl airbag that deploys the airbag from on the engine hood outside the vehicle body to a lower part of a windshield to buffer the impact on the pedestrian may be employed in substitution for the pop-up hood.

The operation of the collision detection device 1 for the vehicle of the present embodiment at the time of collision will be described below. When an object such as a pedestrian collides with the vehicle front, the bumper cover 7 of the bumper 6 is deformed by an impact due to the collision with the pedestrian. Then, the bumper absorber 8 is deformed, absorbing the impact, and at the same time, the chamber member 2 (chamber main body 20) is also deformed. In this case, the pressure in the hollow portion 2*a* of the chamber main body 20 rises sharply, and this pressure change is transmitted to the pressure sensor 3 through the extended portion 20*a*.

In the present embodiment, the clearance S is formed between the rear surface 20*b* of the chamber main body 20 of the chamber member 2 and the front surface 9*a* of the bumper reinforcement 9. The projecting portion 21 protruding from the rear surface 20*b* of the chamber main body 20 is disposed in this clearance S. The end of this projecting portion 21 is in contact with the front surface 9*a* of the bumper reinforcement 9. Accordingly, when the chamber main body 20 is deformed to the vehicle-rear side, the bumper reinforcement 9 can reliably receive the farce from the vehicle-front side to appropriately deform the chamber main body 20. Thus, by providing the projecting portion 21, there can be prevented the decrease of accuracy in the collision detection by the collision detection device 1 for the vehicle because of the reduction in the time-responsiveness of the detection of the pressure change by the pressure sensor 3 due to the displacement of the chamber main body 20 into the clearance S on the vehicle-rear side.

The collision detection ECU 5 of the collision detection device 1 for the vehicle performs the predetermined collision determination processing based on the detection results by the pressure sensor 3 and the speed sensor 4. In this collision determination processing, specifically, the effective mass of the collision object is calculated based on the detection results by the pressure sensor 3 and the speed sensor 4, and it is determined that the collision with the pedestrian has occurred if this effective mass is larger than a predetermined threshold value. Moreover, if the vehicle speed is within a predetermined range (e.g., range from 25 km to 55 km per hour), it is determined that the collision with the pedestrian which requires the actuation of the pedestrian protective device 10 has occurred.

The "effective mass" means the mass calculated by use of a relationship between a momentum and an impulse based on the detection value by the pressure sensor 3 at the time of collision. When the collision between the vehicle and the object has occurred, in the case of the collision object whose mass differs from a pedestrian, the detection value by the pressure sensor 3 is different. For this reason, the types of collision objects can be separated by setting a threshold value between the effective mass of a human body and the mass of the assumed another collision object. This effective mass is calculated by dividing a definite integral value for the pressure value detected by the pressure sensor 3 in a predetermined time by the vehicle speed value detected by the speed sensor 4, as expressed in the following equation.

$$M=(\int P(t)dt)/V \quad \text{(equation 1)}$$

"M" denotes the effective mass, "P" denotes the detection value by the pressure sensor 3 in the predetermined time, "t" denotes the predetermined time (e.g., several milliseconds to several tens of milliseconds), and "V" denotes the vehicle speed at the time of collision. In addition, the calculation using an equation $E=\frac{1}{2} \cdot MV^2$ expressing the kinetic energy E of the object which has collided can be employed as the method of calculating the effective mass. In this case, the effective mass is calculated by $M=2 \cdot E/V^2$.

If the collision detection ECU 5 determines that the collision with the pedestrian which requires the actuation of the pedestrian protective device 10 has occurred, the ECU 5 outputs a control signal for activating the pedestrian protective device 10 to activate the pedestrian protective device 10, thereby reducing the impact on the pedestrian as described above.

As described above, the collision detection device 1 for the vehicle of the first embodiment includes the chamber member 2 that is disposed on the vehicle-front side of the bumper reinforcement 9 in the bumper cover 7 of the vehicle and that includes the chamber main body 20 having therein the hollow portion 2a; and the pressure sensor 3 that detects the pressure in the hollow portion 2a of the chamber main body 20. The collision detection device 1 detects the collision of the object (pedestrian) with the bumper cover 7 based on the pressure detection result by the pressure sensor 3. The clearance S is formed between the chamber member 2 and the front surface 9a of the bumper reinforcement 9 at least on a part of the rear surface 20b of the chamber main body 20. The collision detection device 1 includes the projecting portion 21 which is provided to project from the rear surface 20b of the chamber main body 20 and whose end is in contact with the front surface 9a of the bumper reinforcement 9.

As a result of this configuration, the clearance S that is formed between the rear surface 20b of the chamber main body 20 and the front surface 9a of the bumper reinforcement 9 can be filled effectively with the projecting portion 21 which is provided to project from the rear surface 20b of the chamber main body 20 and whose end is in contact with the front surface 9a of the bumper reinforcement 9. Accordingly, even though the clearance S is formed between the rear surface 20b and the front surface 9a due to the difference in shape between the rear surface 20b of the chamber main body 20 and the front surface 9a of the bumper reinforcement 9, the chamber main body 20 is deformed reliably at the time of the collision occurrence because the rear surface 20b of the chamber main body 20 is supported by the contact of the projecting portions 21 with the front surface 9a of the bumper reinforcement 9. As a consequence, the time-responsiveness of the detection of the pressure change by the pressure sensor 3 can be prevented from being reduced, and the accuracy in collision detection by the collision detection device 1 for the vehicle can thereby be maintained.

Even though a collision is caused at the part of the chamber member 2 having the clearance S on its vehicle-rear side, the external force from the vehicle front can be received reliably by the bumper reinforcement 9 since the end of this projecting portion 21 is in contact with the front surface 9a of the bumper reinforcement 9. Consequently, the chamber main body 20 can be prevented reliably from bending to the vehicle-rear side on which the clearance S exists, to prevent the time of the pressure change detection by the pressure sensor 3 from being delayed.

The projecting portion 21 is formed integrally with the chamber main body 20 by blow molding through the use of a resin material. As a result of this configuration, by forming the projecting portion 21 integrally with the chamber main body 20 by blow molding, there is no need to provide a projecting member which is a separate component so that the projecting portions 21 can be arranged with the manufacturing process simplified. Furthermore, the arrangement positions of the projecting portions 21, the number of the projecting portions 21 arranged, or the shape of the projecting portion 21 can be appropriately changed with ease.

The projecting portion 21 is made from low density polyethylene. As a result of this configuration, the inhibition of the deformation of the chamber main body 20 by the projecting portions 21 can be prevented because the projecting portion 21 is formed from low density polyethylene, which is the same as the material for the chamber main body 20.

The projecting portion 21 is provided to extend in the up-down direction of the vehicle. As a result of this configuration, the clearance S between the chamber member 2 and the bumper reinforcement 9 can be better filled with the projecting portions 21 extending in the up-down direction of the vehicle, so that the decline in accuracy of the collision detection (time-responsiveness) at the time of collision can reliably be prevented. Particularly, since the projecting portion 21 extends in the up-down direction of the vehicle, a contact area between the projecting portion 21 and the bumper reinforcement 9 is sufficiently ensured. Accordingly, the chamber member 2 can be disposed stably on the front surface 9a of the bumper reinforcement 9, and the chamber main body 20 can be appropriately deformed.

The projecting portions 21 are provided at a predetermined interval in the vehicle width direction. As a result of this configuration, the clearance S formed between the rear surface 20b of the chamber main body 20 and the front surface 9a of the bumper reinforcement 9 can be efficiently filled entirely in the vehicle width direction.

The projecting portion 21 is formed in a tapered shape whose diameter is reduced toward its end. As a result of this configuration, because of the shape of the projecting portion 21 being the tapered shape whose diameter is reduced toward its end, after forming the projecting portion 21 integrally with the chamber main body 20 by blow molding using a metal molding die, the metal molding die is removed along the tapered part. Accordingly, the metal molding die is easily removed, and the manufacturing process of the chamber member 2 can thereby be simplified.

The projecting portion 21 is formed into a trapezoidal shape in its planar view. As a result of this configuration, the end part of the projecting portion 21 is made flat, so that the projecting portion 21 of the chamber member 2 can be disposed stably on the front surface 9a of the bumper reinforcement 9 at the time of manufacture.

The clearances S are formed between the chamber member 2 and the front surface 9a of the bumper reinforcement 9 on the rear surfaces 20b of the right and left end regions of the chamber main body 20 in the vehicle width direction. The projecting portions 21 are provided on the rear surfaces 20b of the right and left end regions of the chamber main body 20.

As a result of this configuration, when the clearances S are formed on the rear surfaces 20b of the right and left end regions of the chamber main body 20 in the vehicle width direction due to a difference in curvature between the chamber main body 20 and the bumper reinforcement 9, the projecting portions 21 are provided only at these regions, so that the decrease in accuracy of the collision detection by the chamber main body 20 can be prevented efficiently and effectively.

In addition, the length of the chamber main body 20 in the front-rear direction of the vehicle is constant entirely in the vehicle width direction. As a result of this configuration, since the length of the chamber main body 20 in the front-rear direction of the vehicle is the same along the entire chamber main body 20 in the vehicle width direction, a variation in accuracy of the collision detection in the vehicle width direction of the chamber member 2 (chamber main body 20) can be prevented, and thus the accuracy of the collision detection by the chamber member 2 entirely in the vehicle width direction can be made constant.

Second Embodiment

A second embodiment will be described below with reference to FIG. 9. For the same part in FIG. 9 as in the above first embodiment, the same corresponding reference numeral is given to omit its description, and only different parts will be explained.

Figure 9:
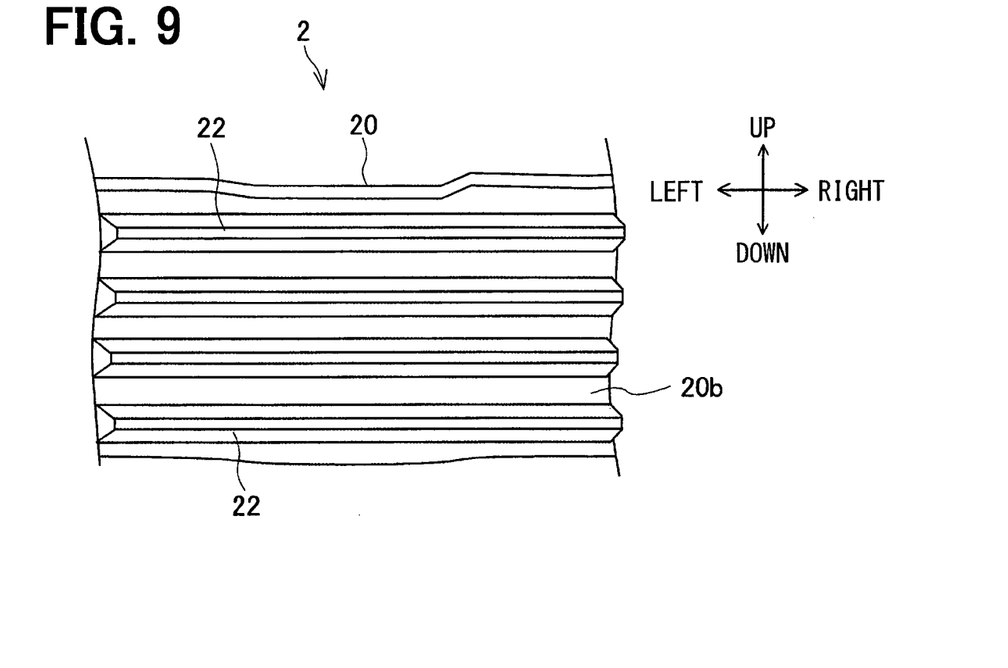
FIG. 9 is a diagram illustrating a chamber member which corresponds to FIG. 4 in accordance with a second embodiment.

In this second embodiment, as illustrated in FIG. 9, projecting portions 22 are provided to extend in the vehicle width direction (right-left direction of the vehicle) on rear surfaces 20b of the right and left end regions of a chamber main body 20 in the vehicle width direction. The projecting portions 22 are arranged at predetermined intervals (e.g., approximately 20 mm) in the up-down direction of the vehicle. The projecting portions 22 may be provided to extend along the entire rear surface 20b of the chamber main body 20 in the vehicle width direction. The distance between the projecting portions 22 in the up-down direction of the vehicle, and the number of the projecting portions 22 arranged can be changed appropriately.

By this second embodiment as well, similar effects to the first embodiment can be produced. Specifically, a clearance S that is formed between the rear surface 20b of the chamber main body 20 and a front surface 9a of a bumper reinforcement 9 can be filled effectively with the projecting portion 22 provided to extend in the vehicle width direction. Accordingly, the reduction in time-responsiveness of the collision detection at the time of collision can be prevented, and the accuracy in collision detection by a collision detection device 1 for the vehicle can thereby be maintained. Particularly, because of the projecting portion 22 being provided to extend in the vehicle width direction, the clearance S between the chamber main body 20 and the bumper reinforcement 9 can reliably be filled entirely in the vehicle width direction.

Third Embodiment

Figure 10:
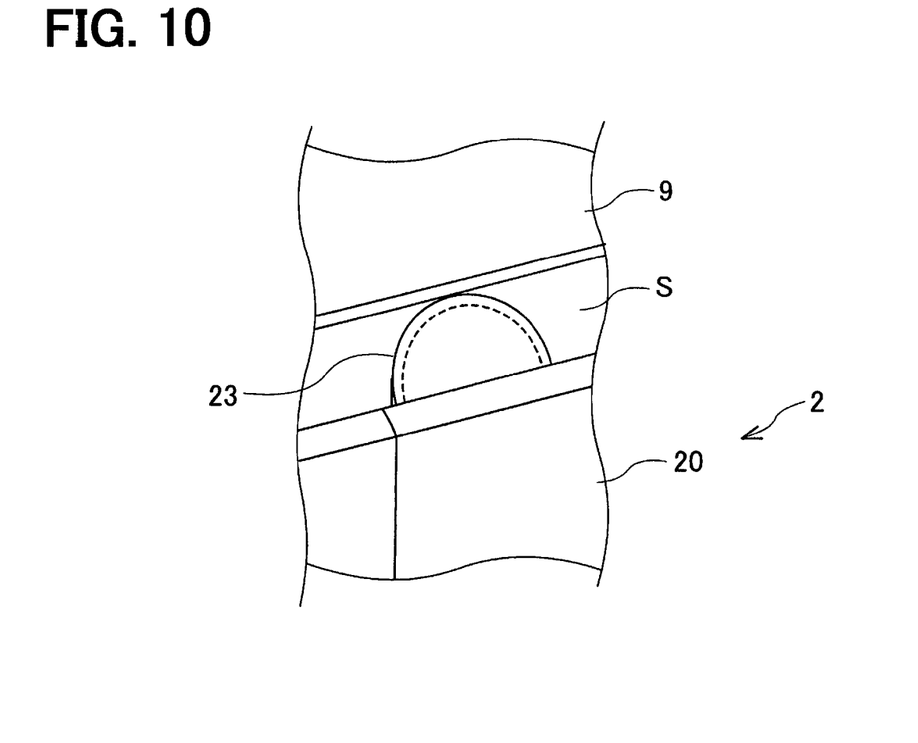
FIG. 10 is a diagram illustrating a chamber member which corresponds to FIG. 5 in accordance with a third embodiment.

A third embodiment will be described below with reference to FIG. 10. For the same part in FIG. 10 as in the above first embodiment, the same corresponding reference numeral is given to omit its description, and only different parts will be explained. In the third embodiment, as illustrated in FIG. 10, a projecting portion 23 is formed in a semicircular shape in its planar view. It should be noted that similar to the first embodiment, more than one projecting portion 23 are provided to extend in the up-down direction of the vehicle and arranged at predetermined intervals in the vehicle width direction.

By this third embodiment as well, similar effects to the first embodiment can be produced. Specifically, a clearance S that is formed between a rear surface 20b of a chamber main body 20 and a front surface 9a of a bumper reinforcement 9 can be filled effectively with the projecting portions 23 that extend in the up-down direction of the vehicle and are arranged at predetermined intervals in the vehicle width direction. Accordingly, the reduction in time-responsiveness of the collision detection at the time of collision can be prevented. As a result, the accuracy in collision detection by a collision detection device 1 for the vehicle can be maintained.

Fourth Embodiment

A fourth embodiment will be described below with reference to FIG. 11. For the same part in FIG. 11 as in the above first embodiment, the same corresponding reference numeral is given to omit its description, and only different parts will be explained.

Figure 11:
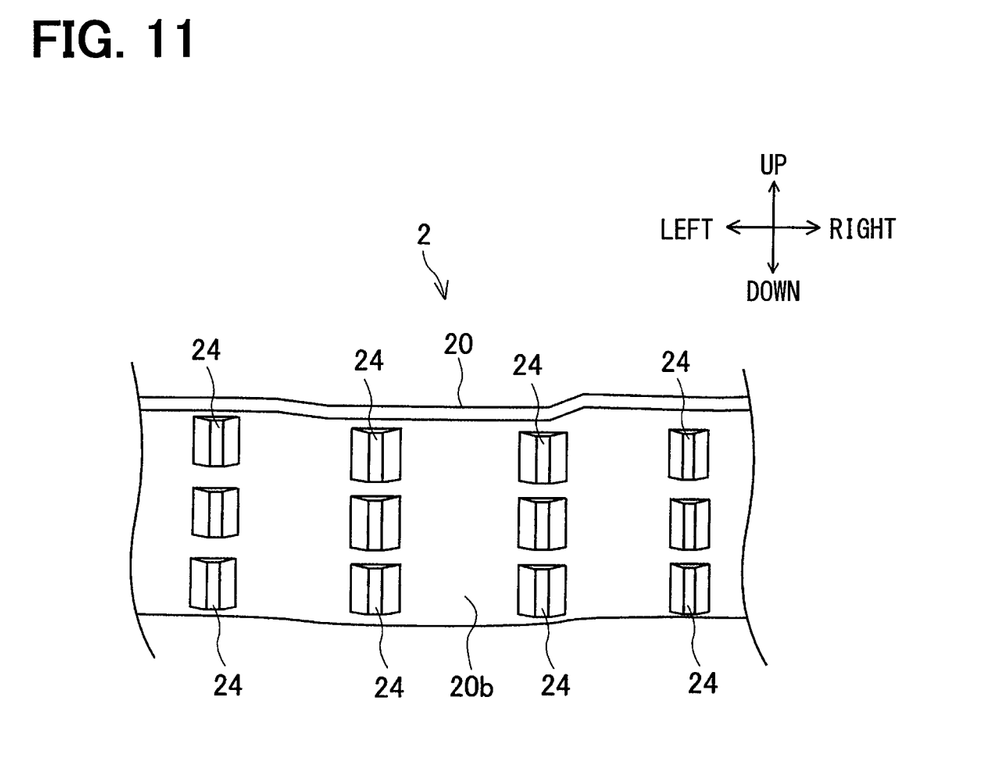
FIG. 11 is a diagram illustrating a chamber member which corresponds to FIG. 4 in accordance with a fourth embodiment.

In this fourth embodiment, as illustrated in FIG. 11, a projecting portion 24 is provided to extend in the up-down direction of the vehicle, and more than one projecting portion 24 are arranged at predetermined intervals in the vehicle width direction. This configuration is similar to the first embodiment, but the fourth embodiment is different from the first embodiment in that the projecting portions 24 are also arranged at intervals in the up-down direction of the vehicle.

Specifically, twenty-one projecting portions 24 are provided in total in four directions (right, left, up, down) on each rear surface 20b of the right and left end regions of a chamber main body 20. The projecting portions 24 are arranged, for example, at intervals of approximately 80 mm in the vehicle width direction, and are arranged, for example, at intervals of approximately 10 mm in the up-down direction of the vehicle. This interval (pitch) is set at such a length that the projecting portion 24 can withstand the load applied at the time of collision between the vehicle and a pedestrian or the like. Similar to the first and second embodiments, the projecting portion 24 is formed into a trapezoidal shape in its planar view. The projecting portions 24 are formed integrally with the chamber main body 20 by blow molding.

By this fourth embodiment as well, similar effects to the first embodiment can be produced. Specifically, a clearance S that is formed between the rear surface 20b of the chamber main body 20 and a front surface 9a of a bumper reinforcement 9 can be filled effectively with the projecting portions 24. Accordingly, even though the clearance S is formed on a vehicle-rear side of a chamber member 2, the delay in time-responsiveness of the collision detection by the chamber member 2 (chamber main body 20) can be prevented, and the accuracy in collision detection by a collision detection device 1 for the vehicle can thereby be maintained.

In comparison with the first embodiment, the projecting portions 24 are also arranged at intervals in the up-down direction of the vehicle. Accordingly, the volume of a hollow portion 2a formed in the projecting portion 24 can be made smaller than in the first embodiment. As a result, the increase in volume in the hollow portion 2a due to the formation of the projecting portion 24 can be limited. Thus, the decreased accuracy in collision detection by the collision detection device 1 for the vehicle can be more reliably prevented.

Modifications of the above embodiments will be described. The present disclosure is not limited to the above embodiments, and various modifications or extensions can be made without departing from the scope of the disclosure.

For example, in the above embodiments, the cross-sectional shape of the chamber main body 20 of the chamber member 2 is the substantially quadrangular shape, but instead of this, a chamber main body 20 whose cross-section shape is circular or polygonal may be used. In the above embodiments, the projecting portion 21 to 24 is formed into a trapezoidal shape or a semicircular shape in its planar view. Alternatively, the cross-sectional shape of the projecting portion 21 to 24 can be appropriately changed.

In the above embodiments, there has been described a case where the clearances S are formed between the chamber member 2 and the front surface 9a of the bumper reinforcement 9 on the rear surfaces 20b of the right and left end regions of the chamber main body 20 in the vehicle width direction. However, the present disclosure is not limited to this case. For example, the present disclosure can also be applied to a case where the clearance S is formed between the rear surface 20b and the front surface 9a of the bumper reinforcement 9 along the entire rear surface 20b of the chamber main body 20 in the vehicle width direction. In this case, the projecting portion 21 to 24 may be provided on the entire rear surface 20b of the chamber main body 20 in the vehicle width direction.

The projecting portion 21 to 24 is formed integrally with the chamber main body 20 by blow molding. However, instead of this, for example, a separate projecting portion 21 to 24 may be adhesively fixed on the rear surface 20b of the chamber main body 20. In addition, the projecting portion 21 to 24 is made from low density polyethylene. Alternatively, the material for the projecting portion 21 to 24 can be appropriately changed as long as the projecting portion 21 to 24 is made from a material that does not negatively affect the deformation of the chamber main body 20 at the time of collision.

To sum up, the collision detection device 1 for a vehicle of the above embodiments may be described as follows.

A collision detection device 1 is for a vehicle having a bumper cover 7 and a bumper reinforcement 9. The collision detection device 1 includes a chamber member 2, a pressure sensor 3, a collision detection ECU 5, and a projecting portion 21, 22, 23, 24. The chamber member 2 is disposed on a vehicle-front side of the bumper reinforcement 9 in the bumper cover 7 and includes a chamber main body 20 having therein a hollow portion 2a. The pressure sensor 3 detects pressure in the hollow portion 2a of the chamber main body 20. A clearance S is formed between the chamber member 2 and a front surface 9a of the bumper reinforcement 9 at least on a part of a rear surface 20b of the chamber main body 20. The collision detection ECU 5 detects a collision of an object with the bumper cover 7 based on a pressure detection result by the pressure sensor 3. The projecting portion 21, 22, 23, 24 is provided to project from the rear surface 20b of the chamber main body 20, and an end of the projecting portion 21, 22, 23, 24 is in contact with the front surface 9a of the bumper reinforcement 9.

As a result of this configuration, the clearance S that is formed between the rear surface 20b of the chamber main body 20 and the front surface 9a of the bumper reinforcement 9 can be filled effectively with the projecting portion 21, 22, 23, 24 which is provided to project from the rear surface 20b of the chamber main body 20 and whose end is in contact with the front surface 9a of the bumper reinforcement 9. Accordingly, even though the clearance S is formed between the rear surface 20b and the front surface 9a due to the difference in shape between the rear surface 20b of the chamber main body 20 and the front surface 9a of the bumper reinforcement 9, the chamber main body 20 is deformed reliably at the time of the collision occurrence because the rear surface 20b of the chamber main body 20 is supported by the contact of the projecting portion 21, 22, 23, 24 with the front surface 9a of the bumper reinforcement 9. As a consequence, the time-responsiveness of the detection of the pressure change by the pressure sensor 3 can be prevented from being reduced, and the accuracy in collision detection by the collision detection device 1 for the vehicle can thereby be maintained.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A collision detection device for a vehicle having a bumper cover and a bumper reinforcement, the collision detection device comprising:
   a chamber member that is disposed on a vehicle-front side of the bumper reinforcement in the bumper cover and includes a chamber main body having therein a hollow portion;
   a pressure sensor that detects pressure in the hollow portion of the chamber main body, wherein a clearance is formed between the chamber member and a front surface of the bumper reinforcement at least on a part of a rear surface of the chamber main body;
   a collision detection electronic control unit (ECU) that detects a collision of an object with the bumper cover based on a pressure detection result by the pressure sensor; and
   a projecting portion which is provided to project from the rear surface of the chamber main body and whose end is in contact with the front surface of the bumper reinforcement,
   wherein the projecting portion is provided to extend in an up-down direction of the vehicle.

2. The collision detection device according to claim 1, wherein the projecting portion is made from low density polyethylene.

3. The collision detection device according to claim 1, wherein the projecting portion is one of a plurality of projecting portions that are arranged at predetermined intervals.

4. The collision detection device according to claim 1, wherein the projecting portion is one of a plurality of projecting portions that are arranged at predetermined intervals in a width direction of the vehicle.

5. The collision detection device according to claim 1, wherein the projecting portion is one of a plurality of projecting portions that are arranged at predetermined intervals in an up-down direction of the vehicle.

6. The collision detection device according to claim 1, wherein:
   the clearance is formed between the chamber member and the front surface of the bumper reinforcement on the rear surface of each of right and left end regions of the chamber main body in a width direction of the vehicle; and
   the projecting portion is provided on the rear surface of each of the right and left end regions of the chamber main body.

7. The collision detection device according to claim 1, wherein the length of the chamber main body in a front-rear direction of the vehicle is constant entirely in a width direction of the vehicle.

8. The collision detection device according to claim 1, wherein the projecting portion is formed integrally with the chamber main body.

9. The collision detection device according to claim 8, wherein the projecting portion is formed integrally with the chamber main body by blow molding using a resin material.

10. The collision detection device according to claim 1, wherein the projecting portion is formed in a tapered shape whose diameter is reduced toward its end.

11. The collision detection device according to claim 10, wherein the projecting portion is formed in a trapezoidal shape in its planar view.

12. The collision detection device according to claim 10, wherein the projecting portion is formed in a semicircular shape in its planar view.

13. A collision detection device for a vehicle having a bumper cover and a bumper reinforcement, the collision detection device comprising:
   a chamber member that is disposed on a vehicle-front side of the bumper reinforcement in the bumper cover and includes a chamber main body having therein a hollow portion;
   a pressure sensor that detects pressure in the hollow portion of the chamber main body, wherein a clearance is formed between the chamber member and a front surface of the bumper reinforcement at least on a part of a rear surface of the chamber main body;
   a collision detection electronic control unit (ECU) that detects a collision of an object with the bumper cover based on a pressure detection result by the pressure sensor; and
   a projecting portion which is provided to project from the rear surface of the chamber main body and whose end is in contact with the front surface of the bumper reinforcement,
   wherein the projecting portion is formed in a tapered shape whose diameter is reduced toward its end.

14. The collision detection device according to claim 13, wherein the projecting portion is formed in a trapezoidal shape in its planar view.

15. The collision detection device according to claim 13, wherein the projecting portion is formed in a semicircular shape in its planar view.

16. A collision detection device for a vehicle having a bumper cover and a bumper reinforcement, the collision detection device comprising:
   a chamber member that is disposed on a vehicle-front side of the bumper reinforcement in the bumper cover and includes a chamber main body having therein a hollow portion;
   a pressure sensor that detects pressure in the hollow portion of the chamber main body, wherein a clearance is formed between the chamber member and a front surface of the bumper reinforcement at least on a part of a rear surface of the chamber main body;
   a collision detection electronic control unit (ECU) that detects a collision of an object with the bumper cover based on a pressure detection result by the pressure sensor; and
   a projecting portion which is provided to project from the rear surface of the chamber main body and whose end is in contact with the front surface of the bumper reinforcement, wherein:
   the clearance is formed between the chamber member and the front surface of the bumper reinforcement on the rear surface of each of right and left end regions of the chamber main body in a width direction of the vehicle; and
   the projecting portion is provided on the rear surface of each of the right and left end regions of the chamber main body.

* * * * *